April 29, 1947.  A. E. RECTOR  2,419,731
ATTACHMENT FOR TRAPS
Filed May 2, 1944
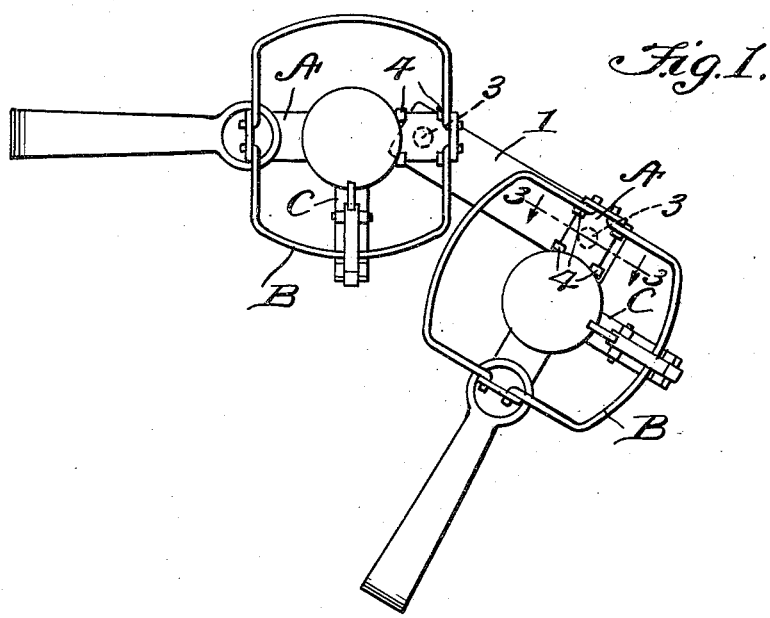
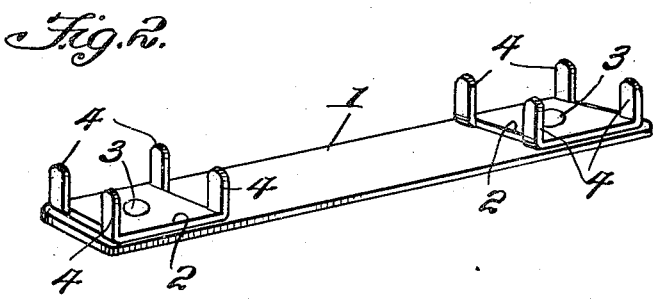
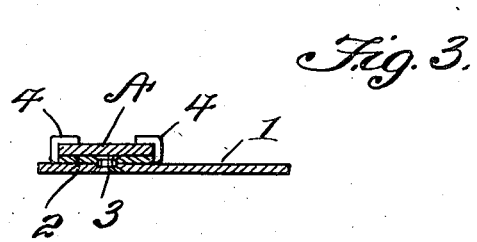
Anson E. Rector,
INVENTOR.
BY Victor J. Evans & Co.
ATTY.

Patented Apr. 29, 1947

2,419,731

UNITED STATES PATENT OFFICE 2,419,731

ATTACHMENT FOR TRAPS

Anson E. Rector, Savannah, N. Y.

Application May 2, 1944, Serial No. 533,735

3 Claims. (Cl. 43—96)

This invention relates to attachments for animal traps of the kind generally used for trapping fur bearing animals such as muskrats, minks, skunks, woodchuck and the like, and one of its objects is to provide a device which I term a dual grip universal trap spacer, in that the attachment is primarily designed for connecting two traps of the spring jaw type together, in spaced relation to each other, to bring about a dual catch, that is the animal becomes caught in both traps, thus rendering escape practically impossible and without mutilating the animal or materially damaging the fur, as generally the animal becomes caught in one trap and in attempting to escape therefrom, becomes caught in the other trap, and is thereby rendered helpless.

A further object is to provide an attachment that can be secured to the traps in an easy and expeditious manner and the device allows adjustment of the traps relative to each other, so that they can be spaced various distances apart for catching animals of different sizes, thus assuring that the animal will be properly caught in both traps.

Another object is to provide an attachment of the character referred to, that is extremely simple in construction, inexpensive to manufacture, and efficient in use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a top plan view illustrating my device in use for connecting two spring jaw traps together.

Figure 2 is a perspective view of the device per se.

Figure 3 is a longitudinal sectional view taken through the device attached to the base member of a trap on the line 3—3 of Figure 1.

Referring to the drawings in detail, and particularly to Figure 1, it will be noted that I have illustrated my device as being attached to a pair of identical traps of the spring pressed jaw type, each trap including a strip like base member A having jaws B connected to the ends thereof, and fixed to and extending centrally and laterally from the base member is the usual pan supporting bracket C, all of which form no part of my invention, as will be apparent.

My device as best shown in Figure 2 includes a flat elongated rectangular body member 1 preferably made into a single strip from strap metal and is of any appropriate length. Superimposed on each end portion of the body member to rest thereon is a clamping element that includes a substantially rectangular plate 2 in the form shown, and the plates are riveted to the body member to allow rotation thereof, but are frictionally held against free rotation, that is, the plates bind against the body member, thus necessitating considerable force for moving the same on their rivets 3 which act as pivots therefor, as will be apparent.

Formed on or otherwise fixed to each of the plates 2 at the corners thereof, are flat upright clamping lugs 4 that are adapted to be bent toward the plate and against the upper face of the base member A of a trap for securing the device thereto, as best shown in Figure 3.

In attaching the traps together, through the instrumentality of my device, that portion of the base member A of one trap, between the pan supporting bracket C and the end of the base member opposite to the trap spring is mounted between the clamping lugs of one plate to rest upon the latter between the flat faces of the lugs and the lugs are then bent in clamping engagement with the base member. The base member of the other trap is clamped to the other plate in the same manner, thus it will be seen that the two traps are connected together in spaced relation, for adjustment at various angles relative to each other, as will be apparent upon inspection of Figure 1. It will be further seen that my device will in no way interfere with the setting of the traps or the movement of the jaws thereof, to closed position.

The adjustability of the traps is important, as it allows them to be moved toward and away from each other for disposal various distances apart for catching animals of different sizes, that is if the traps are set for catching small animals such as muskrats and minks, the traps are adjusted for disposal in close association, and when they are set to catch larger animals, such as skunks and woodchuck, they are adjusted for disposal a considerable distance apart, as the important feature is to catch the animal in both traps, to render the same helpless so as to not only prevent escape, but to eliminate mutilation and damage to the fur.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An attachment for connecting a pair of spring jaw animal traps together for cooperative association, comprising a flat elongated body member, clamping means for securing a trap at each end of the body member for holding the same in spaced relation to each other, said clamping means provided with pivots for pivotally securing the clamping means to said body member to allow relative adjustment of the traps, and the pivots of said means acting to hold the clamping means in binding engagement with said body member to prevent casual adjustment of the traps.

2. An attachment for connecting a pair of spring jaw animal traps together for cooperative association, comprising a flat elongated rectangular body member, a plate at each end of the body member and the plates being provided with rivets for riveting the plates to the body member for rotation thereon, lugs formed on the plates for disposal in clamping engagement with traps for holding the latter spaced from each other and for relative adjustment, and said rivets holding the plates in binding engagement with the body member to prevent casual adjustment of the traps.

3. An attachment for connecting a pair of spring jaw animal traps together for cooperative association, comprising a flat elongated rectangular body member, a plate at each end of the body member and the plates being provided with rivets for riveting the plates to the body member, with the rivets extending through the centers of the plates to allow rotation of the latter, upright lugs formed on the corners of the plates for disposal in clamping engagement with traps to hold the latter spaced from each other for relative adjustment, and said rivets holding the plates in binding engagement with the body member to prevent casual adjustment of the traps.

ANSON E. RECTOR.

REFERENCES CITED

The following references are of record in the file of this patent:

UNITED STATES PATENTS

| Number | Name | Date |
|---|---|---|
| 1,083,086 | Green | Dec. 30, 1913 |
| 1,309,036 | Knight | July 8, 1919 |
| 1,431,648 | Frye | Oct. 10, 1922 |
| 1,767,789 | Garbs | June 24, 1930 |
| 1,501,713 | McCaffrey | June 15, 1924 |
| 1,515,055 | Katolin | Nov. 11, 1924 |